United States Patent [19]

Cornelius

[11] Patent Number: 4,669,309
[45] Date of Patent: Jun. 2, 1987

[54] TANK CONTENTS GAUGE

[75] Inventor: John Cornelius, Harrogate, Great Britain

[73] Assignee: Tankmaster Limited, England

[21] Appl. No.: 575,268

[22] Filed: Jan. 30, 1984

Related U.S. Application Data

[63] Continuation of Ser. No. 303,180, Sep. 17, 1981, abandoned.

[30] Foreign Application Priority Data

Sep. 19, 1980 [GB] United Kingdom ................. 8030336

[51] Int. Cl.⁴ ........................ G01F 23/14; G01F 23/18
[52] U.S. Cl. ......................................... 73/299; 73/301; 73/302
[58] Field of Search ................. 73/301, 302, 303, 300, 73/299

[56] References Cited

U.S. PATENT DOCUMENTS

| | | | |
|---|---|---|---|
| 1,681,504 | 8/1928 | Smithe | 73/303 |
| 2,041,859 | 5/1936 | Pyle, III et al. | 73/302 |
| 2,613,535 | 10/1952 | Born | 73/302 |
| 2,755,669 | 7/1956 | Beard | 73/302 |
| 3,182,502 | 5/1965 | Mayes | 73/222 |
| 3,373,609 | 3/1968 | Sundby | 73/299 |
| 4,006,635 | 2/1977 | Khoi | 73/302 |
| 4,393,705 | 7/1983 | Eidschun | 73/289 |
| 4,422,327 | 12/1983 | Anderson | 73/303 |

FOREIGN PATENT DOCUMENTS 156575 2/1961 Fed. Rep. of Germany ........ 73/299

Primary Examiner—Charles Frankfort
Assistant Examiner—Thomas B. Will
Attorney, Agent, or Firm—Wegner & Bretschneider

[57] ABSTRACT

A tank contents gauge is disclosed having two pressure sensors to sense the liquid pressure at two tank positions at known vertical separation, a port to sense the ambient pressure in the tank, and a transducer to which the three pressure readings are transmitted one at a time by a switching mechanism. If the transducer is a differential transducer, its second side is connected to the port to allow (1) comparison of the pressure readings with the ambient pressure reading and (2) determination of transducer offset to adjust the calculations to give accurate readings. The readings are analysed by a data processing system which can provide volume and weight readings by internal look-up calibration tables. The system may also control the switching mechanism. Specific gravity values can be calculated from the pressure readings and the known vertical separation; the values can be stored in the system for use when the tank contents approaches, or falls below, the level of the upper sensor.

6 Claims, 5 Drawing Figures

TANK CONTENTS GAUGE

This application is a continuation of Ser. No. 303,180, filed Sept. 17, 1981 now abandoned.

FIELD OF THE INVENTION

The present invention relates to tank contents gauges. Such contents are gauged at present by using a hydrostatic head of liquid method of measurement. A hollow tube or probe is placed in the liquid and the upper end of the tube is fed from an air supply through an air flow restrictor. At a certain pressure all the liquid in the probe will be forced out and excess air will leak out of the probe to form bubbles in the liquid. At this point a state of balance exists and the air pressure in the probe equals the hydrostatic head of pressure of the liquid. A probe that operates in this way is hereafter called a hydrostatic probe.

As the level of liquid varies within the vessel the pressure within the probe varies in direct proportion, therefore by measuring this air pressure and knowing the specific gravity of the liquid, the depth of the liquid can be determined.

$$\text{depth of liquid} = 10197 \times \frac{P}{S.G.} \text{ millimeters} \quad (1)$$

(where P=air pressure in bars and S.G.=specific gravity)

From equation (1) above it is obvious that the accuracy of level measurement depends on the stability of the specific gravity of the product within the tank during batch and temperature variations. One commonly used method of measuring the specific gravity of the liquid is to insert two hydrostatic probes into the tank, or vessel, the second probe being at a known distance above the first probe. The S.G. is then determined by a differential pressure measurement between the probes.

$$\text{Specific gravity} = \frac{Pd}{D} \times 10197 \quad (2)$$

(where Pd=differential air pressure in bars and D=physical distance between probes in millimeters)

Using this system two pressure signals are available, a pressure reading from the main probe gives the hydrostatic head of liquid and the pressure differential between probes gives the specific gravity.

Using these two measurements the depth of liquid can be computed.

$$\text{depth of liquid} = \frac{P \times D}{Pd} \text{ millimeters} \quad (3)$$

from (1) and (2)

On pressurised tanks it is not practical to use the probe described above. Instead sealed diaphragm transmitters would be used and as a differential pressure measurement is required three transmitters are necessary, one at the bottom of the tank, one at approximately 10% of the height of the tank and one at the top of the tank to measure the ambient pressure in the tank above the liquid.

The disadvantages of the above system are firstly that two pressure transducers are used, with the result that the accuracy is dependent on the accuracy of the two transducers. Secondly, when the liquid level is approaching, or below, the level of the upper probe or transmitter, the S.G. indication will be in error tending to zero.

SUMMARY OF THE INVENTION

According to the present invention there is provided a tank contents gauge comprising pressure sensing means for sensing the pressure at two points at a known vertical separation in a tank and the pressure above the liquid in the tank, and a pressure transducer characterised in that the pressure transducer is selectively fluidically connected via a switching mechanism to receive the three pressure readings from the pressure sensing means.

The invention as claimed is intended to remedy the drawbacks of the above prior art. It solves the problem of reliance on transducer accuracy and the need to calibrate the transducers by using a single transducer, the offset and sensitivity of which can be catered for in computation of data. To cate for the problem of accurate S.G. indication at low tank levels, the transducer is connected to a data processing system which stores the last known S.G. value for the contents for use when the gathered data is inadequate for computing a reliable S.G. value.

The advantages offered by the invention are mainly that the system in self-calibrating and that the system produces more reliable data whatever the tank liquid level. The system can also readily be extended to scan and produce data for several tanks and to produce alarm signals in particular circumstances.

BRIEF DESCRIPTION OF DRAWINGS

The invention will now be described, by way of example, with reference to the accompanying drawings, in which:

FIG. 3A illustrates yet another pressure sensing device for use in the gauge of FIG. 1.

SPECIFIC DESCRIPTION OF PREFERRED EMBODIMENTS

Figure 1:
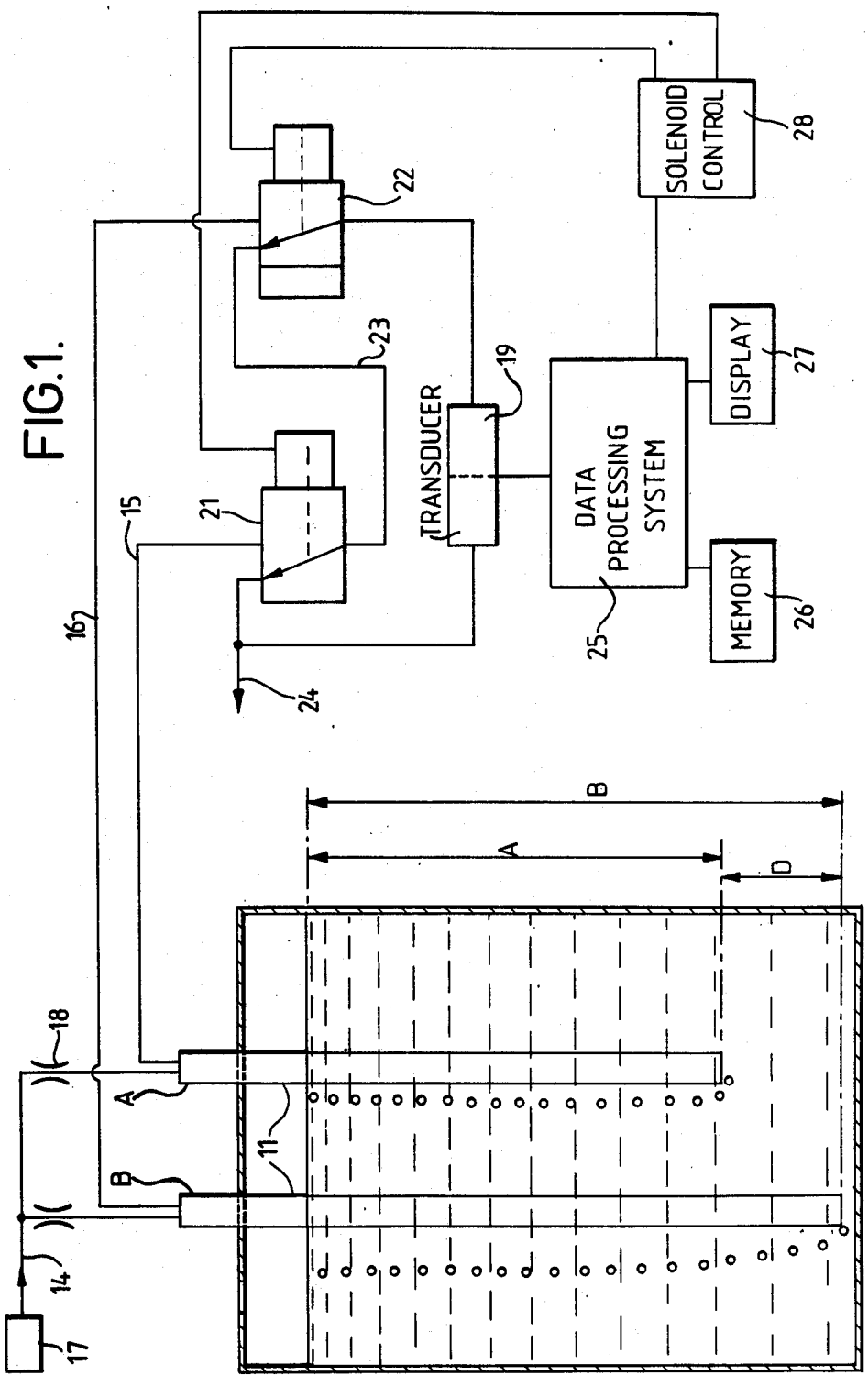
FIG. 1 is a diagram of a tank contents gauge according to the present invention.

The tank contents gauge illustrated in FIG. 1 is designed for use in locations where it is acceptable to use pressure sensors in the form of hydrostatic probes, such as with petrol in a ventilated tank. In such an arrangement two pressure sensors A,B each comprise a hollow tube 11 of about 22 mm outer diameter, tube B being longer than tube A. The tubes may be copper, stainless steel, a compatable rigid plastics material or metal, according to the required use.

Figure 3:
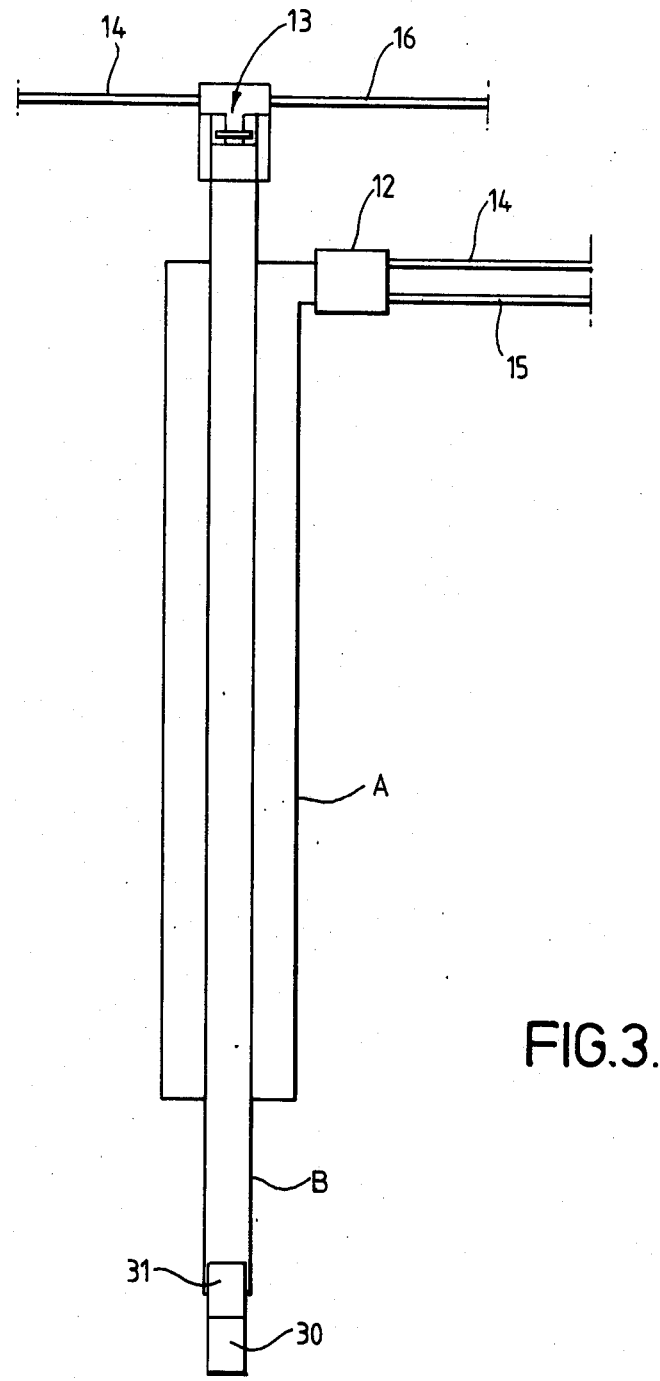
FIG. 3 illustrates a further pressure sensing device for use in the gauge of FIG. 1.

Each probe 11 has a probe head 12 fitted at the top of the probe outside the tank incorporating a special connector and non-return valve 13 (see FIG. 3 for details). This prevents any escape of liquid or gas should one of the air supply tubes be damaged, or in the event of a delivery of liquid when the probe is no pressurised. Alternatively the non-return valves may be fitted inside the probes or within a short distance thereof.

Each probe has two air lines (14,15; 14,16;) connected to the probe head 12 in the form of 6 mm outer diameter tubes. These tubes would normally be nylon, but copper or other materials may be used for certain applications. One tube 14 carries air at low pressure from a compressor 17 via a regulator (not shown) and restrictor 18 to the probe 11, while the other 15,16 carries an air pressure rating back to a differential pressure transducer 19. While embodiments of the invention and their operation are described with air as the operating medium, it will be appreciated that other suitable gasses could be used.

The air for the system may be provided by the separate air compressor 17, or from the on-site air provided it is filtered and reduced to a suitable pressure. On large installations monitoring above ground tanks it is sometimes necessary to provide an air dryer, especially where pressure transmitters are used instead of hydrostatic probes.

The lines 15,16 are connected to respective solenoid valves 21,22. The valve 22 is connected to one side of the pressure transducer 19 and switches the pressure applied to the transducer terminal between line 16 and a line 23 to the solenoid valve 21. The valve 21 switches between line 15 and an outlet port 24 which is connected to ambient pressure in the tank. Ambient pressure is also transmitted from the outlet port 24 to the other side of the pressure transducer 19. Thus by switching the solenoids 21,22 in turn the following differential pressure readings can be taken.

(i) with settings as shown in FIG. 1, the reading Z=the offset of the transducer, as there is no applied pressure across the transducer.
(ii) with solenoid 21 energised, a reading $A = P_a + Z$ =hydrostatic pressure head at probe A+offset of transducer 19.
(iii) with solenoid 22 energised, a reading $B = P_b + Z$ =hydrostatic pressure head at probe B+offset of transducer.

Thus subtracting the offset Z from the second and third readings, the hydrostatic pressure at the two probes A and B is established, unaffected by any zero error in the transducer. By providing an extra solenoid (not shown) in the series, the transducer can also be connected to a reference pressure whereby the sensitivity S of the transducer can be determined as described hereafter.

Where more than one tank is to be connected to the same gauge, each tank would have two probes each transmitting air pressure to respective solenoids. The solenoids are connected in series with each solenoid switching between a probe line (such as 15) and the next solenoid, except the first solenoid which would switch between an ambient pressure port and a probe line. The last solenoid is connected to the transducer 19. When using the gauge with more than one tank, means for selecting the tank to be measured is provided.

Once the three readings for the required tank have been taken, by combining equations (1) and (2) the depth of liquid can be determined.

$$\text{depth of liquid} = \frac{(P_b \times S) \times D}{(P_b \times S) - (P_a \times S)} \text{ millimeters}$$

The specific gravity of the liquid $$= \frac{P_b - P_a \times 10197}{D}$$

is also calculated by the system and displayed, or used to calculate the weight of the contents. However this reading is effected by the sensitivity of the transducer (S) and should the transducer drift, the calculated S.G. will be inaccurate. For many purposes the approximate S.G. or weight reading will be sufficient. Where required, an accurate specific gravity can be determined from the equation $$S.G. = \frac{(P_b - P_a) \times S}{D} \quad (4)$$

$$\text{where } S = \frac{P_r}{R}$$

where $S = (P_r/R)$ by taking the transducer reading R of a known reference pressure $P_r$ transmitted to the transducer.

Where the level of liquid drops toward the bottom end of the probe A and before, the measurement $P_a$ will tend to zero and therefore give an incorrect depth reading. To overcome this problem the S.G. determined at any reading is remembered, and before the depth is calculated the value $P_a$ is tested to ensure that it is of sufficient magnitude for an accurate computation of depth. If not, the last determined value of S.G. is used.

The hysteresis factor of the transducer is cancelled out by ensuring that the next pressure measurement is always higher than the previous measurement, and by the method described i,e ambient-probe A-probe B, this is always achieved. However by reversing the sequence to Probe B-Probe A-ambient, a similar result would be achieved. By using a transducer with a low hysteresis the sequence is not important and the ambient check need only be carried out once for each scan of the vessels.

Because the air pressure at Probes A and B is similar for high levels of liquid where nonlinearity would have most effect on accuracy of the transducer, the linearity factor can be treated as a variable sensitivity factor S and will therefore cancel out as in equation (3). At low levels the ratio of the readings becomes higher and non-linearity will have more effect on the accuracy of the readings. However using the method of testing the pressure $P_a$ for validity, and substituting an earlier S.G. where the reading is not valid, this problem can be minimised.

The calculations of equations (3) and (4) as well as conversion to volume, weight etc of liquid, can be determined by connecting the pressure transducer 19 to an analogue or analogue and digital processing system 25 having a memory 26 and a display 27. A print out can be provided if required. In the embodiment illustrated the processing system also switches the solenoids to take the readings automatically via a solenoid control 28.

Figure 4:
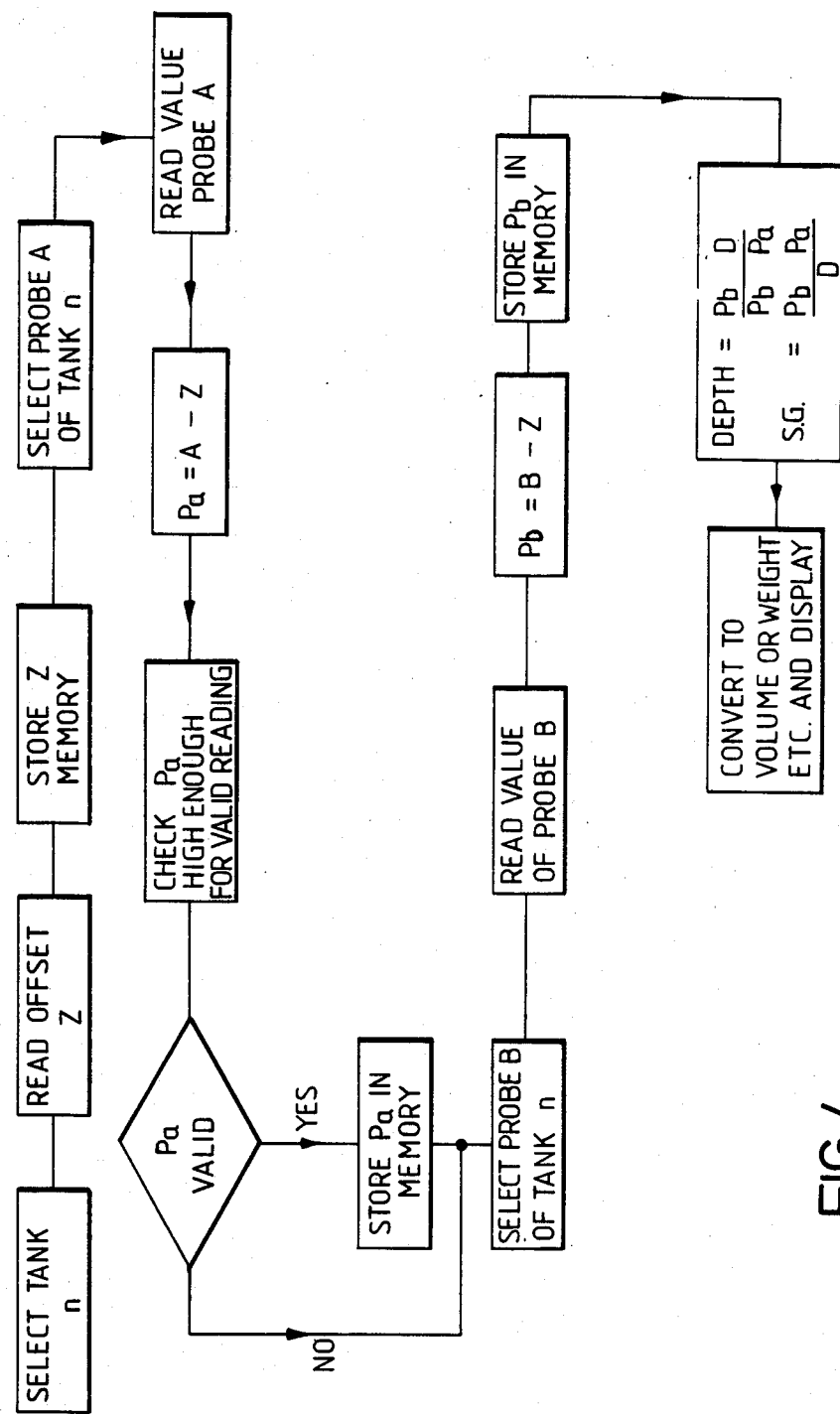
FIG. 4 is a flow diagram of the operation of the gauges of FIGS. 1 and 2.

The flow chart of FIG. 4 illustrates the sequence of events carried out by the processing system 25. Firstly the memory 26 is fed with any required tank data. Before a specific reading or a scan of tanks a reference pressure is transmitted to the transducer and the sensitivity factor $S = P_r/R$ is calculated and stored in memory 26.

Once a tank has been selected for measurement, a pressure reading with the solenoid valves associated with that tank de-energised is taken to give the offset Z of the transducer which is stored in the memory 26. The hydrostatic pressure head at Probe A is then read, with solenoid valve 21 energised, and corrected for offset $(A-Z)=P_a$. The system 25 then compares $P_a$ with a pre-programmed figure to check whether the read value is high enough to give a valid depth reading. If so $P_a$ is stored. The solenoid valve 22 is then energised to give a reading B, which is corrected for offset $(B-Z)=P_b$ and stored in memory 26.

If $P_a$ is valid the mathematical calculations (3) and (4) will then be made and the answers displayed or used for further calculations. If the pressure at Probe A is not high enough for a valid reading, the depth will be calculated using equation (1) and the last determined S.G. or a specific value fed into the memory. A further facility can be incorporated to measure temperature and, if required, calculate a normalised volume at a reference temperature.

In an alternative program the equations could have included the offset of the transducer ($P_a$ replaced by $A-Z$) and the actual pressure readings at probes A and B could have been stored instead of the corrected pressures.

Figure 2:
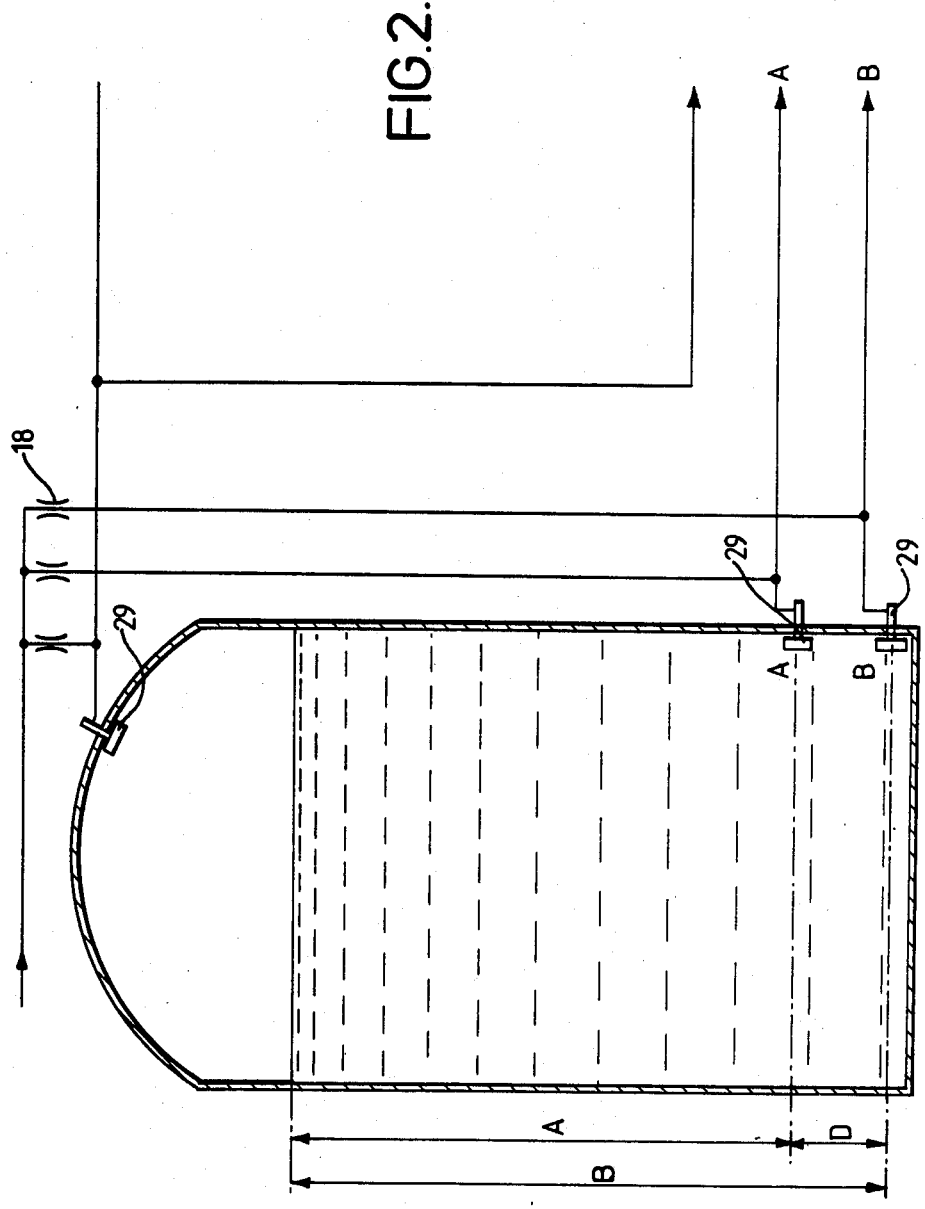
FIG. 2 is a partial diagram of a second gauge according to the invention.

If the liquid is not to be contaminated with bubbles, such as with foodstuffs and chemicals, the pressure measurements are taken using sealed diaphragm transmitters 29 instead of hydrostatic probes and the pneumatic lines are as illustrated in FIG. 2. The pressure signals are obtained and used in the same way as has already been described with reference to FIG. 1, but may require further processing to compensate for non-linearity within the transmitter.

Instead of a differential transducer it would be possible to use other transducers, for example an absolute transducer. With other transducers three readings would again be taken, ambient pressure+offset=$P_{amb}$; pressure at probe A+offset=$P_a'$; and pressure at probe B+offset=$P_b'$. The calculations to be performed are then:

$$\text{depth of liquid} = \frac{(P_b' - P_{amb}) \times D}{(P_b' - P_{amb}) - (P_a' - P'_{amb})}$$

$$= \frac{(P_b' - P_{amb}) \times D}{P_b' - P_a'}$$

$$S.G. = \frac{(P_b' - P_a') \times S}{D}$$

Thus using this apparatus a depth of liquid is determined using automatic compensation for specific gravity when the depth of liquid is inadequate for a valid reading. The method of measurement also compensates for offset and sensitivity of the transducer. The way that the apparatus is used means that the effects of hysteresis and non-linearity of the transducer are also as small as possible.

All tanks are continuously monitored by pressure switches so that in the event of a fill, instant warning is given via an audible alarm, for example when the tank contents reach about 95% of tank capacity. If the apparatus is not being used for data collection, that tank will automatically be selected and the contents displayed. If the apparatus is in use, the display will occur as soon as the use has finished.

The apparatus can be programmed to scan periodically all the tanks on the system and compare the current alarm position with that of a previous scan. If the level has dropped to or below a predetermined low or extra low level, an audible alarm will sound and the tank or tanks causing the alarm will have their designation and contents displayed, and if a print out is provided, printed.

The alarm sensors, (not shown) are all housed in a pneumatics cabinet (not shown). The cabinet also houses the filters and restrictors 18 for the air supply, as well as the solenoid valves, and an air fail alarm which activates audible and visual warnings should the air from the compressor be interrupted.

An alarm can also be fitted to give a warning if the S.G. is outside pre-programmed limits, or if more than a pre-programmed amount of contents is removed from a tank at a certain time.

Naturally the information to be displayed or printed out in any one scan or specific reading would depend on the requirements of a particular installation. However the processing system 25 can be programmed to use the data collected relating to depth and S.G. in each tank to print out any of the following: volume in tank, weight of contents, delivery capacity, delivery made, volume dispensed since last reading, total of each product dispensed. The tank number and date and time of reading would normally be given together with the product in the particular tank if necessary.

In a preferred embodiment the two hydrostatic probes A and B are concentrically mounted with the longer tube B inside the shorter tube A. A spacer 30 ensures that the probe is displaced from the floor of the tank by a known distance so as to operate effectively out of any sediment that may have settled on the floor of the tank. Both the tubes A and B are fitted with diffusers to diffuse the gas passing down them and each tube carries a non-return valve 13 at the top to prevent flow back of the liquid in the tank beyond a predetermined level. The probe head 12 connected to the tube B is shown in section to illustrate the non-return valve. The diffuser for the probe B can be in the form of a cuboid, the bottom half of which forms the spacer 30. The top part of the diffuser, which is fluted, is inserted into the bottom of the tube B to form the diffuser 31. A single air supply to the inner tube can be used if the two tubes are the same length and the outer tube has an exit in the form of one or more openings at a predetermined position to form the upper sensor and reading $P_a$. Using concentric tubes, the distance between the two pressure sensors can be very accurately known.

This embodiment is shown in FIG. 3, leader line A.

If required a water sensor can be incorporated in the bottom of the probe B. A cuboid of composite material is used as spacer and diffuser as described in the preceding paragraph, the lower part of the cuboid being of electrically non-conductive material and the remainder of the cuboid being electrically conductive and connected to a conductivity or capacitance measuring circuit which would indicate the presence of water by means of an audible and/or visual alarm.

What we claim is:

1. A method of measuring the liquid contents of a tank comprising
    placing first and second pressure sensors at a known vertical distance apart in said tank, with said second sensor sensing the pressure at a higher level than said first sensor, placing means for taking a pressure reading above the liquid in said tank, connecting, for each reading of tank contents to measure the liquid contents thereof, each of said first sensor, said second sensor and said means for taking a pressure reading above the liquid in said tank selectively to a single pressure transducer by a switching mechanism to produce electrical signals, transmitting said electrical signals to a data processing system having a memory and having been programmed to compare said electrical signals with a preset pressure value to indicate whether the liquid depth is sufficient for a valid reading at said second sensor, permitting said data processing system to compare said electrical signals with said preset pressure value, and, depending on the result of the comparison, carrying out one of the following operations:
(a) if the pressure reading at said second sensor is above said preset pressure value, calculating a specific gravity from the electrical signals and the known vertical separation and storing said specific gravity in the memory of said data processing system as a last calculated specific gravity, and calculating the liquid depth using this specific gravity value; or
(b) if the pressure reading at said second sensor is below the preset pressure value, calculating the liquid depth using said last calculated specific gravity value from the memory.

2. The method of claim 1 wherein said transducer is a differential transducer having one side connected to read the pressure above the liquid in the tank and the other side switchable between said first sensor, said second sensor and said means for taking a pressure reading above the liquid, thus giving three electrical signals.

3. The method of claim 1 wherein said tank is one of a plurality of tanks connected to said switching mechanism, each tank having a first sensor, a second sensor and a means for taking a pressure reading above the liquid, and the method further comprises scanning said sensors in each tank through said single transducer selectively fluidically connected to the sensors in every tank by means of said switching mechanism to obtain pressure readings in the form of electrical signals and transmitting said signals to said data processing system for the calculations in that tank to be made.

4. The method of claim 1 wherein said first and second sensors comprise respective hydrostatic pressure probes of different diameters mounted one within the other, the two tubes forming said probes having exits for gas at different axial positions along the length of the tubes, the inner tube carrying a spacer by means of which the distance of the inner probe from the bottom of the tank can be determined, and said spacer including a water sensor incorporated therein, said water sensor being of composite material, the lower part thereof being formed of electrically conductive material and being connected to a conductivity or capacitance circuit.

5. The method of claim 3 wherein said first and second sensors comprise respective hydrostatic pressure probes of different diameters mounted one within the other, the two tubes forming said probes having exits for gas at different axial positions along the length of the tubes, the inner tube carrying a spacer by means of which the distance of the inner probe from the bottom of the tank can be determined, and said spacer including a water sensor incorporated therein, said water sensor being of composite material, the lower part thereof being formed of electrically conductive material and being connected to a conductivity or capacitance circuit.

6. The method of claim 1 wherein said switching mechanism comprises at least two solenoid switches and a solenoid control operable by said data processing system.

* * * * *